United States Patent Office 3,052,317
Patented Sept. 4, 1962

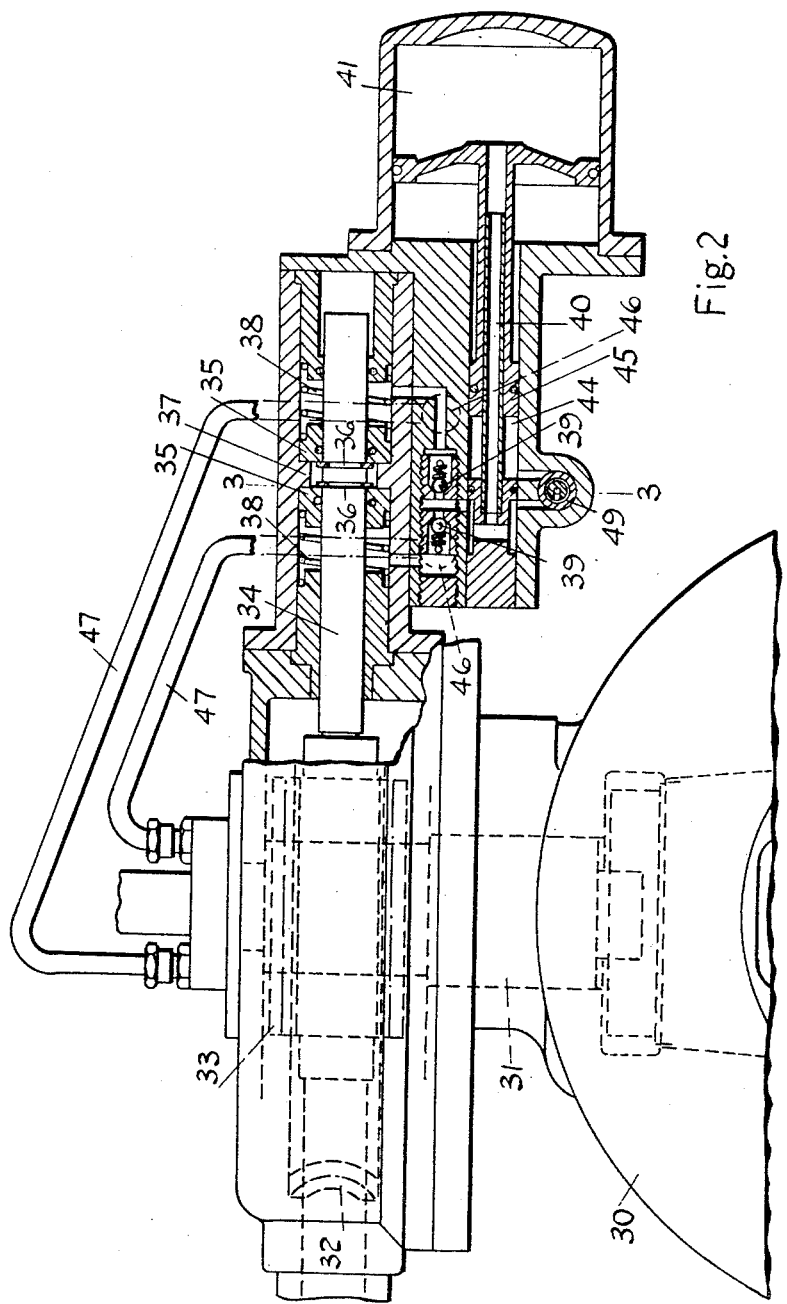

3,052,317
MEANS FOR USE IN THE LUBRICATION OF FLUID CONTROLLING VALVES AND OTHER ARTICLES
Edward Blackwell Leach, Ash Hill, Compton, England, assignor to Audley Engineering Company Limited, Newport, Shropshire, England
Filed Sept. 28, 1960, Ser. No. 59,043
Claims priority, application Great Britain Oct. 27, 1959
7 Claims. (Cl. 184—6)

This invention relates to means for use in lubricating fluid controlling valves and other articles. It is envisaged that the invention will be especially applicable to the lubrication of rotary plug valves although it may be applied to other articles having moving parts.

The object of the present invention is to provide a new or improved arrangement by means of which lubricant can be automatically supplied to the valve or other article if excessive force is required to operate the article.

According to the invention, means for lubricating a fluid controlling valve or other article having a part movable by actuating mechanism comprises in combination with the article to be lubricated and the actuating mechanism, a pump unit provided with valve-controlled inlets and outlets and connected to said mechanism so as to be operable thereby only when the resistance to motion of said movable part exceeds a predetermined amount, a lubricant reservoir connected to the valve-controlled inlets of said pump unit for supplying lubricant thereto, means through the medium of which lubricant can flow from the valve-controlled outlets of said pump unit to the movable part of said article, and a fluid pressure responsive device which is connected to the valve-controlled outlets of said pump unit and said reservoir and under the action of which lubricant can be supplied from said reservoir to said pump unit in response to the pressure of lubricant discharged through said valve-controlled outlets.

Figure 1:
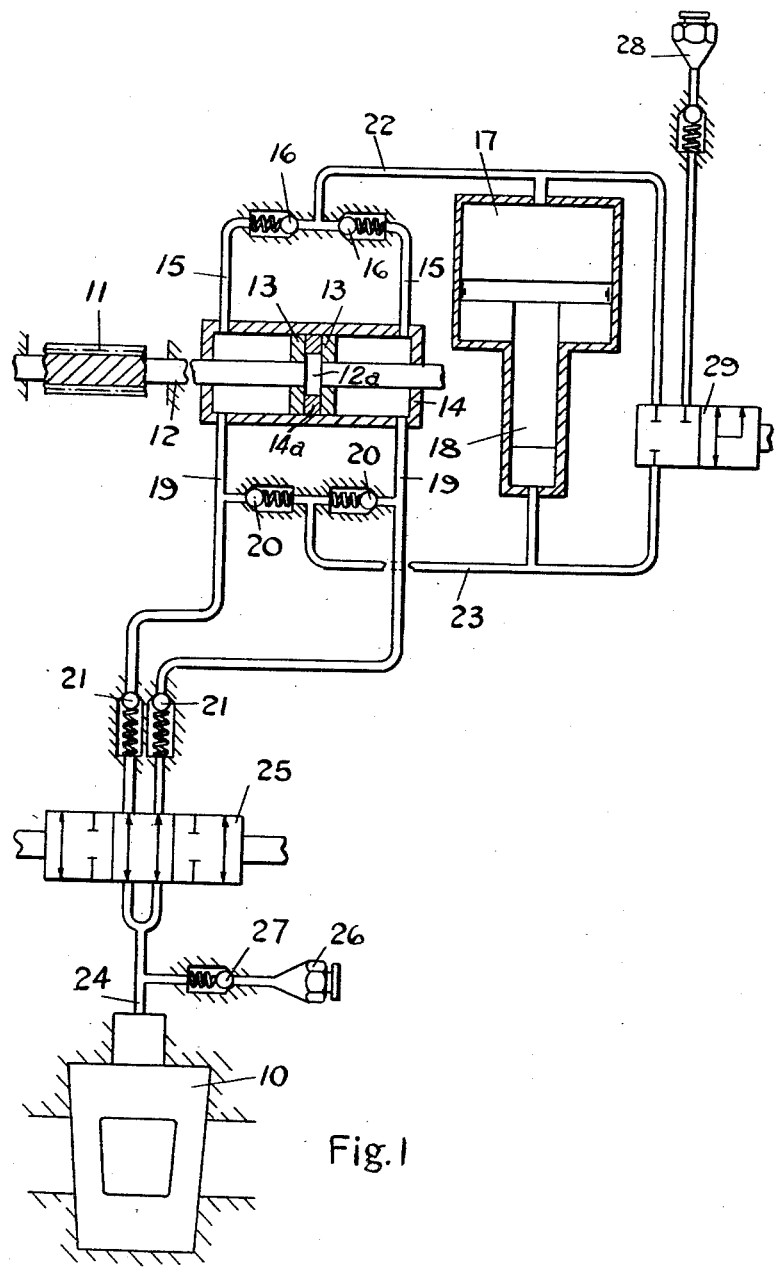
Figure 4:
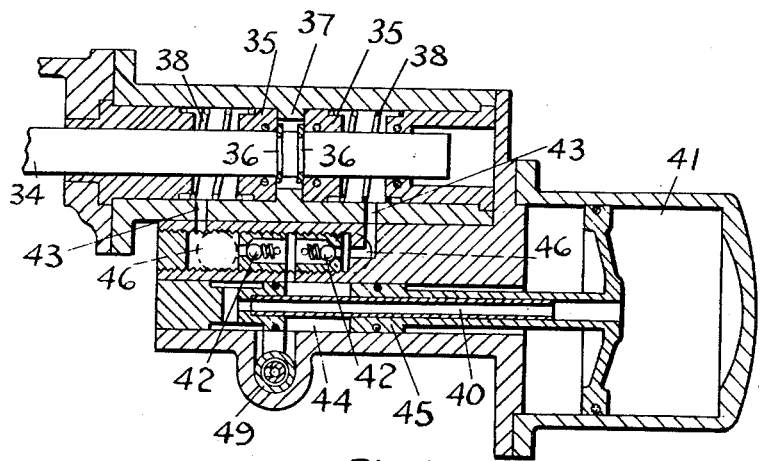
Figure 3:
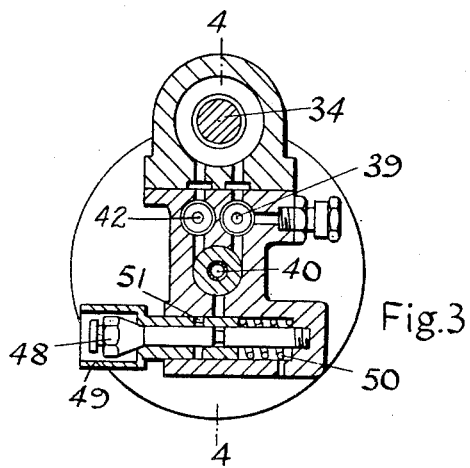

The invention is now more particularly described with reference to the accompanying drawings wherein:

FIGURE 1 is a diagrammatic arrangement showing one form of means constructed in accordance with the present invention, FIGURE 2 is a part sectional and fragmentary side elevation which shows a construction embodying the invention, and FIGURES 3 and 4 are respectively a section on the line 3—3 of FIGURE 2 and a section on the line 4—4 of FIGURE 3.

Referring firstly to the diagrammatic arrangement shown in FIGURE 1 the article to be lubricated is indicated by reference numeral 10 and is intended to represent a rotary plug valve. The plug of said valve is connected to a worm wheel (not shown) which is adapted to be operated under normal conditions by a worm 11. At one end of said worm there is provided a spindle 12 which extends coaxially through a cylinder 14 of a pump unit having a double acting piston in the form of a pair of relatively movable and coaxially arranged single acting parts 13 which are situated within the cylinders at opposite sides of an annular abutment 14a in the form of an internal rib on the cylinder, and which are slidably mounted on the spindle at opposite sides of another annular abutment 12a in the form of a circlip or collar on the spindle. Consequently, when the spindle 12 is moved axially in either direction, the annular abutment 12a thereon causes corresponding movement of one of the piston parts 13, and the annular abutment 14a in the cylinder 14 prevents corresponding movement of the other piston part. The pump unit cylinder 14 is provided at each end with an inlet 15 controlled by a spring-loaded non-return inlet valve 16.

There is also provided a lubricant reservoir 17 in which is disposed a ram 18. The pump unit cylinder 14 is also provided at each end with an outlet 19, each outlet being connected to a non-return valve 20 and a further spring-loaded valve 21 which remains closed until a predetermined pressure is reached in the corresponding outlet 19, and will open to allow lubricant to flow towards the valve 10. The valves 21 also act as non-return valves to prevent flow of lubricant from the valve 10 to the pump unit. A connection 22 is made from the lubricant reservoir to the inlet side of the pump unit and a connection 23 is made from the outlet side of said pump unit to the space behind the ram 18.

In use when it is desired to rotate the plug of the valve the worm 11 would be rotated either manually or by power-operated means. The worm will act initially in the manner of a screw so that one of the piston parts 13 in the pump unit cylinder 14 will be displaced until the pressure in the pump unit is sufficient to balance the effort required to turn the worm wheel which engages the worm. Pressurized lubricant from the pump unit will flow through one of the valves 20 via connection 23 to the space behind ram 18, thereby pressurizing the reservoir 17 and feeding lubricant into the inlet side of the pump unit.

If the resistance to rotation of the valve 10 is low, the pressure developed in the pump unit will be insufficient to open the corresponding valve 21 against its spring and rotation of the valve 10 will result in the usual way.

On the other hand, if resistance to rotation of the valve 10 is relatively high, the pressure developed in the pump unit will open the corresponding valve 21 so that lubricant is supplied to the feed pipe 24 leading to the surface of the valve 10 which is to be lubricated. It will be appreciated that the lubricant in the reservoir 17 is pressurized by the ram 18 so that there will be no difficulty in supplying the pump unit with lubricant even though the latter may be of relatively viscous nature.

In addition, there is provided a cut-off valve 25 which is mechanically interconnected with the rotary plug of the valve 10 so that when the rotary plug reaches one end of its range of movement any further supply of lubricant from the pump unit to the rotary plug will be cut off by the valve 25. There is also provided a connection 26 together with a spring-loaded non-return valve 27 whereby lubricant can be introduced to the valve 10 by manual operation or by means additional to the pump unit 14.

For re-charging the lubricant reservoir there is provided a connection 28 together with an equalising valve or device 29 which is arranged to equalise the pressure in the lubricant reservoir 17 and behind the ram 18 when it is required to supply further quantities of lubricant. Thus said equalising valve 29 would be moved to the left as shown in FIGURE 1 when it is required to re-charge the reservoir.

Referring now to FIGURES 2–4 which show a practical construction, a rotary plug valve is generally indicated by reference numeral 30. The rotary plug is mounted on a spindle 31 on which is provided a worm wheel 32 operable by a manually rotatable worm 33. One end of the worm is extended to form a piston rod 34 on which is mounted a two-part piston. Thus the piston comprises two parts 35 which are engaged on one side by an annular abutment in the form of a circlip or collar 36 on the piston rod 34, and the arrangement is such that longitudinal movement of the piston rod 34 in one direction will carry with it one of the piston parts 35, the other piston part remaining in a position in which it engages another annular abutment formed by an internal rib or shoulder 37 against which it is held by a spring 38.

The section shown in FIGURE 2 represents the inlet side of a pump unit provided by the two part piston and the associated cylinder and the two valves 39 correspond to the valves 16 shown in FIGURE 1. Said valves 39 communicate with the interior of a tube 40 which is arranged to pass lubricant from the reservoir 41 corresponding to the reservoir 17 of FIGURE 1.

FIGURE 4 is a sectional view showing the outlet side of the pump unit and the valves 42 correspond to the valves 20 of FIGURE 1. Thus any lubricant pumped from one end of the pump unit will pass via a passage 43 through one of said valves 42 and thence to an annular space 44 surrounding the tube 40 to act on a ram 45 adapted to apply pressure to lubricant in the reservoir 41. Cross bores 46 serve to lead high pressure lubricant to the pipes 47 (see FIGURE 2) which lead to the surfaces which are to be lubricated and there would also be provided a cut-off valve (not shown) which acts in the manner of cut-off valve 25 already described.

The connection for re-charging the lubricant reservoir is indicated by reference numeral 48 in FIGURE 3 which corresponds to the connection 28 shown in FIGURE 1 and which shows the connection mounted in a slidable sleeve 49 urged outwardly by a spring 50, said sleeve 49 having ports 51 so that the sleeve and associated ports correspond to the equalising valve 29 shown in FIGURE 1.

The single acting piston parts 35 (equivalent to piston parts 13 in FIGURE 1) enable several charges of lubricant to be delivered in succession to the valve or other article to be lubricated if one stroke of the piston rod proves insufficient to free the movable part of the article. Thus, referring again to FIGURE 1, when the valve 10 reaches one end of its range of movement, the cut-off valve 25 isolates one of the valves 21 from the valve 10, and thereby prevents the flow of lubricant from one end of the pump unit cylinder 14 to the valve 10, but as the other valve 21 is not isolated from the valve 10 by the cut-off valve 25, it will be possible for lubricant to be supplied from the other end of the pump unit cylinder 14 when the spindle 12 is moved axially in the appropriate direction.

In the example above described the worm 33 is rotated manually but it is to be understood that it can be operated by power-actuated means. Furthermore, the pump unit may incorporate a rotary vane instead of a reciprocable piston as described.

Having thus described my invention what I claim as new and desire to secure by Letters Patent is:

1. Means for lubricating an article having a part movable by actuating mechanism, comprising in combination with the article to be lubricated and the actuating mechanism, a pump unit provided with valve-controlled inlets and outlets and connected to said mechanism so as to be operable thereby only when the resistance to motion of said movable part exceeds a predetermined amount, a lubricant reservoir connected to the valve-controlled inlets of said pump unit for supplying lubricant thereto, means including spring pressed valves through the medium of which lubricant can flow from the valve-controlled outlets of said pump unit to the movable part of said article, and a fluid pressure responsive device which is connected to the valve-controlled outlets of said pump unit and said reservoir, and under the action of which lubricant can be supplied from said reservoir to said pump unit in response to the pressure of lubricant discharged through said valve-controlled outlets.

2. Means according to claim 1, wherein said actuating mechanism includes a rotatable and axially movable driving worm, and said pump unit comprises in combination a cylinder provided at its ends with the valve-controlled inlets and outlets, a double acting piston contained in said cylinder, and an axially movable and rotatable rod interconnecting said piston and worm, said cylinder and rod being provided respectively with internal and external annular abutments, and said piston having a pair of relatively movable coaxial parts which are slidably mounted on said rod at opposite sides of said abutments so that said coaxial parts are axially movable relative to each other in opposite directions respectively by axial movements of said rod.

3. Means according to claim 1, wherein said fluid responsive device comprises a ram having a part situated within said lubricant reservoir.

4. Means according to claim 3, and comprising a device for equalising the lubricant pressure in said reservoir and said ram when it is desired to re-charge said reservoir with lubricant.

5. Means according to claim 1, wherein said fluid pressure responsive device comprises a piston which is contained in said lubricant reservoir so as to be movable in response to the pressure of lubricant discharged through the valve-controlled outlets of said pump unit, and which is provided with a hollow rod through which lubricant can flow from said reservoir to the valve-controlled inlets of said pump unit.

6. Means according to claim 1, and having a cut-off valve which is arranged between the valve-controlled outlets of said pump unit and a rotary plug forming the movable part of the article to be lubricated, and which is operatively connected to said rotary plug so that when the latter reaches each end of a predetermined movement the supply of pressurized lubricant to said article from said pump unit is terminated by said cut-off valve until said rotary plug is urged in the opposite direction.

7. Means according to claim 6, and having auxiliary lubricating means for supplying lubricant to said rotary plug, and a lubricant supply pipe which extends between said cut-off valve and said rotary plug, and to which said auxiliary lubricating means is connected.

References Cited in the file of this patent

UNITED STATES PATENTS

| | | |
|---|---|---|
| 2,055,449 | Beckwith | Sept. 22, 1936 |
| 2,764,999 | Stanbury | Oct. 2, 1956 |